United States Patent [19]

Wefer

[11] 4,444,840
[45] Apr. 24, 1984

[54] CALENDERED AES FILM

[75] Inventor: John M. Wefer, Newtown, Conn.

[73] Assignee: Uniroyal, Inc., New York, N.Y.

[21] Appl. No.: 406,598

[22] Filed: Aug. 9, 1982

[51] Int. Cl.$^3$ .............................................. B32B 27/32
[52] U.S. Cl. .................................... 428/339; 428/493; 428/521; 428/522
[58] Field of Search ............... 428/520, 332, 462, 463, 428/496, 339

[56] References Cited

U.S. PATENT DOCUMENTS

| 3,489,821 | 1/1970 | Witt et al. | 525/75 |
| 4,202,948 | 5/1980 | Peascoe | 525/70 |

OTHER PUBLICATIONS

"Modern Plastics Encyclopedia", vol. 52, Edition 75-76.

Primary Examiner—George F. Lesmes
Assistant Examiner—E. Rollins Buffalow
Attorney, Agent, or Firm—James J. Long; Bert J. Lewen

[57] ABSTRACT

Calendered AES film containing 25-40% rubber; usually pigmented.

3 Claims, No Drawings

CALENDERED AES FILM

This invention relates to a calendered film of thermoplastic AES graft copolymer composition.

The AES graft copolymer composition employed in the invention is described in U.S. Pat. No. 4,202,948, Peascoe, May 13, 1980 and is ordinarily based on a graft copolymer of resin-forming monomeric material (especially such monomers as vinyl aromatics, alkenoic nitriles, esters, or acids, or mixtures thereof, e.g., a mixture of styrene and acrylonitrile) on an olefin copolymer rubber spine, whether a saturated ethylene-propylene rubber (EPM) or an unsaturated terpolymer (EPDM) containing a suitable diene, especially a non-conjugated diene, as in rubbery terpolymers of ethylene, propylene, and dicylopentadiene, ethylidene norbornene, hexadiene, or the like. In the preparation of such a graft copolymer, much of the resin-forming monomers become chemically grafted to the rubbery spine, but a certain amount of ungrafted resin is also formed (i.e., grafting efficiency is not 100%). In a preferred practice, additional separately prepared resin is blended with the product of the graft polymerization step. Typically, separately prepared styrene-acrylonitrile resin (SAN) is blended with the product of graft polymerization of styrene and acrylonitrile on EPDM. However, it is also possible to make all of the resinous portion in situ during the graft polymerization. In either case the entire final SAN-EPDM product may be referred to as AES.

AES compositions are useful as they combine high impact strength, rigidity, and weatherability. Articles of all sorts may be made by injection molding, profile extrusion or sheet extrusion. These major process operations may also be followed by other operations such as trimming, cutting, painting, thermoforming, fastening, welding, etc., to produce the finished article.

In the case of sheet extrusion, AES is extruded as an integral material or coextruded over one or both sides of a less weatherable material such as ABS (acrylonitrile-butadiene-styrene). In the latter case the AES layer or layers provide a protective screen to prevent or delay degradation of the substrate from the harmful effects of outdoor exposure, especially sunlight. This protective layer is most effective in screening out sunlight when it is pigmented. The level of pigment and thickness of the AES layer that will provide adequate protection of the substrate must be determined on a case-by-case basis and will depend upon the type of pigment used, type of substrate, expected severity of sunlight exposure and desired lifetime of the product. The degree to which the AES protective layer will be "drawn down" (made thinner) during thermoforming of the sheet into a particular article must also be taken into account. In general terms, however, the higher the pigment loading in the cap layer or layers, the more effective will be the screening effect.

There are practical limits, however, for at very high loadings of pigment the impact strength of the AES layer will be significantly reduced. It is known that a reduction in impact strength on the surface layer of a sheet can reduce the impact strength of the entire sheet.

Another limitation of the coextruded sheet approach to producing weatherable articles is that a second extruder and special coextrusion feedblock or manifold die must be used.

It has surprisingly been found that the foregoing limitations of prior practices can be overcome in a particularly advantageous manner by a calendered AES film having a high rubber content, particularly a rubber content within the range of from 25-40% of rubber (typically EPM or EPDM) based on the total weight of rubber plus resin (including both resin formed in situ and any added separately prepared styrene-acrylonitrile resin or the like). Especially preferred is a rubber content of from 28 to 32%.

The calendered film of the invention is normally laminated onto one or both sides of a less weatherable thermoplastic, such as ABS, during sheet extrusion. The pigmented laminated film serves as a screen to protect the less weatherable substrate from the harmful effects of sunlight.

The calendered film of the invention is normally supplied on a roll and is laminated onto a thermoplastic sheet such as ABS by feeding it between the hot extrudate and the pinch roll of a typical extruded sheet production line. If desired, two such rolls of calendered film may be fed between the extrudate and pinch rolls so as to laminate both sides of the sheet. A second extruder and special feedblocks or manifold dies are not needed as in coextrusion.

The unexpected advantages arising from using such a high rubber content AES graft copolymer composition to make the calendered film of the invention include increased toughness and ductility, improved impact retention during weatheraging, and improved calenderability and flexibility of the film. Compared to stiffer, lower rubber versions of AES, the reduced modulus of the present calendered film is not a disadvantage in the final formed article since it is laminated to an appropriately stiff substrate polymer.

The presence of a tough, ductile layer (i.e., the calendered film of the invention) on the surface of the composite sheet will tend to increase the impact resistance of the entire sheet and improve the impact retention during weathering.

In another aspect the invention is concerned with a pigmented calendered film. As already noted, effective screening of sunlight by the AES cap layer (or layers) depends in large measure on the type and level of pigment used in the AES layer. In the present invention, the relatively high levels of rubber used allow higher loadings of pigment before an unacceptable loss in impact strength results. It is generally true that the higher the level of pigment in the AES layer, the thinner can be that layer for effective screening.

The quantity of pigment present in the high-rubber calendered AES film of the invention is not critical but normally falls within the range of from 5 parts or less to 20 parts or more, per 100 parts by weight of the AES. Any suitable conventional pigment may be used. An important consideration in choosing pigments for outdoor use is lightfastness. Inorganic pigments tend to be more lightfast than organic pigments although many organic pigments are sufficiently lightfast for outdoor use. Examples of suitable pigments are titanium dioxide pigments such as Unitane OR-450 (trademark), iron oxide pigments such as Pure Red Iron Oxide R1299 (trademark), carbon black such as Black Pearls 900 (trademark) and Irgazin Red BPT (trademark). Ordinarily up to 20 parts by weight of pigment is used, per 100 parts by weight of AES.

The calendered film of the invention may be prepared on a conventional calender. In the preparation of the calendered film, the AES is normally banded on a heated two-roll mill and fed to a calender with heated rolls. A mixer such as a Banbury (trademark) mixer may be used to introduce pigment and other ingredients into the AES and can supply a fluxed mass to the holding mill. The calender roll clearance is adjusted so that AES film may be drawn off at the desired thickness, normally from 10 to 25 mils, although thinner (e.g., 5 mils or less) or thicker (e.g., 50 mils or more) calendered films or sheets can also be made. A winding device is normally used so that the film is obtained in a convenient roll. The rolled film is particularly useful for laminating to other plastics such as ABS during sheet extrusion as previously described.

The AES employed in the invention is preferably prepared by blending two separate components, namely:

(A) a graft copolymer of styrene and acrylonitrile on EPDM rubber, particularly ethylene-propylene-5-ethylidene-2-norbornene terpolymer rubber; and (B) separately prepared styrene-acrylonitrile resin.

Examples of the graft copolymer component (A) and the separately prepared resin component (B) are described in more detail in U.S. Pat. No. 4,202,948, Peascoe, May 13, 1980. The preferred graft copolymer (A) is prepared by graft copolymerizing (a) styrene and acrylonitrile in weight ratio of 80/20 to 65/35 on (b) a rubbery terpolymer of ethylene, propylene and 5-ethylidene-2-norbornene in which the weight ratio of ethylene to propylene is within the range of from 80/20 to 20/80. The Mooney viscosity of the terpolymer rubber (b) is preferably from about 40 to 80 ML-4 at 257° F. and the iodine number of the rubber (b) preferably is from 15 to 40. The amount of (a) acrylonitrile/styrene is about 50% based on the weight of (a) plus (b).

The preferred separately prepared resin (B) is a copolymer of styrene and acrylonitrile in weight ratio of 80/20 to 65/35 having an intrinsic viscosity in dimethylformamide at 30° C. of at least 0.4. The amount of resin (B) in the AES is sufficient to provide an over-all ratio of resin to rubber in the range of from 75/25 to 60/40.

In a particularly valuable form the invention, an antioxidant is present during the graft copolymerization stage.

Component A (the graft copolymer) and component B (the separately prepared resin), are sheared or masticated together at elevated (fluxing) temperature, for example in a twin screw type of extruder-blender, or batch mixer such as Banbury mixer. Other ingredients such as UV stabilizers and pigments may also be added at this stage.

The following example will serve to illustrate the practice of the invention in more detail.

EXAMPLE

A graft copolymer may be prepared as described in U.S. Pat. No. 4,202,948 (Example 2) referred to above.

A 10-gallon autoclave equipped with a thermometer and a motor stirrer is charged with 413 parts by weight of water, 0.27 parts by weight of Methocel K-100 (trademark; hydroxypropyl methylcellulose produced by Dow Chemical Company) 100 parts by weight of ethylene-propylene-5-ethylidene-2-norbornene copolymer of 60/40 ethylene/propylene ratio, 20 iodine number and 68 ML-4 at 257° F. which has been ground to a Tyler mesh particle size 3, and a mixture of 75 parts by weight of styrene, 40 parts by weight of acrylonitrile, 3 parts by weight of Lupersol-11 (trademark; 75% t-butylperoxy pivalate in mineral spirits) as a polymerization initiator, and 1.0 part of antioxidant, e.g., octadecyl-3,5-di-tert-butyl-4-hydroxyhydrocinnamate.

The reaction mixture is heated to 80° F. for 1½ hours and then to 240° F. and kept at this temperature for another 1½ hours at which time the reaction mixture is cooled to room temperature and the graft copolymer recovered by filtering and drying overnight in an oven at 66° C.

To make the AES, 60 parts of graft copolymer, 40 parts of SAN resin (Tyril 880B; trademark), and 0.75 parts each of Tinuvin P (trademark) and Tinuvin 770 (trademark) UV stabilizers are mixed in a Werner & Pfleiderer ZSK twin screw extruder equipped with a high shear screw and pelletizing system.

To make the calendered film the AES pellets are mixed in a Banbury with appropriate pigment, for example, eight parts of titanium dioxide (OR-450; trademark) and dropped onto a two-roll mill heated to 320° F. The banded AES is fed into a calender heated to 310° F. with the roll clearance adjusted for 15 mil film. AES film at 15 mil thickness is pulled off and wound into a roll.

The data in Table I below are illustrative of the fact that AES containing a high percentage of rubber exhibits higher impact strength at high pigment levels than does AES containing less rubber. Table I compares the impact strength, at various pigment levels, of compositions based on AES containing 30% EPDM, and compositions based on AES containing 23% EPDM. To make the compositions, titanium dioxide pigment (OR-450) was added in the amounts shown in Table I in a Rheocord Type M Torque Rheometer during blending of the graft with separately prepared SAN resin (Tyril 880). Test specimens were cut from ⅛" compression moldings.

| Graft/SAN | % EPDM In Blend | Parts TiO$_2$ | N.I.R.T.$^{(a)}$ | NI −20° F.$^{(b)}$ | Rockwell-R$^{(c)}$ |
|---|---|---|---|---|---|
| 46/54 | 23 | 5 | 10.2 | 1.5 | 91 |
| 46/54 | 23 | 10 | 7.9 | 1.3 | 90 |
| 46/54 | 23 | 15 | 5.2 | 1.0 | 91 |
| 60/40 | 30 | 5 | 13.3 | 6.9 | 62 |
| 60/40 | 30 | 10 | 12.9 | 3.7 | 64 |
| 60/40 | 30 | 15 | 11.8 | 2.8 | 65 |

$^{(a)}$Notched Izod at Room Temperature (ASTM D256)
$^{(b)}$Notched Izod at −20° F. (ASTM D256)
$^{(c)}$Rockwell Hardness, R-scale (ASTM D785)

What is claimed is:

1. A laminate comprising a thermoplastic substrate having on at least one surface a layer of calendered film having a thickness of from 4 to 50 mils, comprising a graft copolymer composition of resin forming material on an olefin copolymer rubber spine, the rubber content of the composition being from 25% to 40% by weight, and the composition containing 5% to 20% by weight of pigment, the said resin forming material being styrene and acrylonitrile and the said olefin copolymer rubber being ethylene-propylene copolymer or ethylene-propylene-non-conjugated diene terpolymer.

2. A laminate as in claim 1 in which the composition contains 5% to 20% by weight of titanium dioxide pigment.

3. A laminate as in claim 1 in which the substrate of the said laminate is an ABS composition.

* * * * *